2,725,300
Patented Nov. 29, 1955

United States Patent Office

2,725,300

METHOD OF PREPARING A STABILIZED WHEAT BASE AND THE RESULTING PRODUCT

Joseph Cryns, Chicago, Ill.

No Drawing. Application May 28, 1952,
Serial No. 290,616

14 Claims. (Cl. 99—80)

(Granted under Title 35, U. S. Code (1952), sec. 266)

The invention described herein, if patented, may be manufactured and used by or for the Government for governmental purposes, without the payment to me of any royalty thereon.

This invention relates to a stabilized wheat base, and more particularly to a dehydrated composition containing wheat germ and wheat bran, which is highly resistant to storage deterioration, and which may be used for imparting whole wheat flour characteristics to white wheat flour upon admixture therewith.

Baked products made from whole wheat flour are highly nutritious and palatable. However, the flour and baking trade experiences difficulties in the storage of whole wheat flour, particularly in hot weather. Whole wheat flour tends to become rancid and develop off-odors in about six weeks during hot weather storage; this fact severely limits its commercial possibilities and renders its employment in military baking operations during hot weather and in tropical climates impractical. Ordinary white flour, on the other hand, has excellent storage capacity and will keep almost indefinitely; however, baked products made from ordinary white flour are considered by most authorities on nutrition to be inferior to whole wheat flour products, and to many consumers do not possess a taste appeal of whole wheat flour baked products.

I have discovered a wheat base composition which contains wheat germ and wheat bran components and possesses excellent storage stability. This wheat base, when mixed with ordinary white flour, yields a "rebuilt" flour composition whose contents correspond to those of regular whole wheat flours; baked products made from that composition are indistinguishable in taste and appearance from ordinary whole wheat flour baked products, e. g. whole wheat bread or rolls. While ordinary whole wheat flour spoils in about six weeks during hot weather, I have found that the storage life of a stabilized wheat base in accordance with my invention is substantially equal to the storage life of ordinary white flour. A stabilized wheat base in accordance with the present invention contains a minor portion of wheat germ and a major portion of wheat bran and/or shorts; it is stabilized by pressure-steaming, followed by dehydration to the desired residual moisture content, as will be explained in more detail hereafter.

Among the objects of the present invention, a principal object is a wheat preparation of great stability and capable of converting ordinary white flour into a flour having the characteristics of whole wheat flour.

A further object of the present invention is to provide a food base containing nutrient and flavor constituents absent from white flour, which may be used for supplementing white flour in military and civilian baking operations.

A further important object of my invention is the facilitation and lengthening of storage of components used in making whole wheat baked products.

A further object of my invention is a simple and safe process for making a whole wheat base having the foregoing characteristics.

Other objects and advantages of my invention will become apparent from the following detailed description of preferred embodiments of stabilized whole wheat compositions made in accordance with the principles of the said invention.

More particularly, I have found that a stable wheat base may be made by stirring wheat bran or wheat shorts, or a mixture of these two components with water, placing this composition in a closed system, e. g., a pressure steamer, steaming at a temperature exceeding the boiling point of water and at pressure exceeding atmospheric pressure for a period depending on such temperature and pressure, and drying to a predetermined moisture content. A minor proportion of wheat germ component is preferably stirred in prior to the pressure-steaming; however, in another, presently less preferred procedure, the wheat germ may be separately pressure-steamed and then blended with the pressure-steamed and dried wheat bran and/or shorts after completion of the processing.

A typical whole wheat flour contains about 2.5–3% wheat germ, about 20–24% roughage (about 10–12% wheat shorts, and about 10–12% wheat bran), and about 75% "white flour" (i. e. the starch and gluten components which are produced by complete milling of the wheat grain and marketed as white flour). Accordingly, a wheat base capable of converting ordinary white flour into a flour composition resembling whole wheat flour should contain wheat germ, wheat shorts, and wheat bran in the approximate proportions of 10:45:45; this composition, when added to wheat flour in a proportion of about 1 part of wheat base to about 3 parts of white flour will correspond to the composition of ordinary whole wheat flour. Inasmuch as short-milled wheat flour contains substantial proportions of bran, the formulation for the wheat base can be varied by substituting short-milled flour, e. g. "red dog flour" or "second clear flour" for part or all of the bran constituent. In making up the final flour composition, allowance must be made, of course, for the "white flour" contents of the short-milled flour.

The amount of water to be added prior to pressure-steaming may vary within wide limits. I have found, generally, that at least 25 parts by weight of water should be added in order to bring out the flavor of the wheat base; on the other hand, to add more than 50% water does not improve the final result, and adds to the cost of dehydration.

The heart of the treatment is the pressure-steaming. I have found that processing in moist steam is necessary, inasmuch as processing in dry hot air yields a product lacking in the desirable flavor characteristics of whole wheat, when finally added to white flour. The contact with the moist steam takes place in a closed system such as a pressure steamer. The pressure of super-heated moist steam is a function of its temperature; I have used steam pressures from about 1 to 20 lbs./sq. in. gage pressure (pressure above atmospheric pressure of 14.696 lbs./sq. in.), which corresponds to temperatures of 215.4 to 258.8° F. (see Handbook of Chemistry and Physics, 29th ed., page 1823). The time of treatment varies approximately inversely with the temperature and pressure conditions inside the closed system; thus, at a gage pressure of 1 lb./sq. in. a 5 hour treatment is indicated, while at 20 lbs./sq. in. gage pressure a 1 hour treatment is sufficient. In practice I prefer a 1½–2 hour heat processing at 235–248° F. (8–14 lbs./sq. in. gage pressure).

Below about 235° F., it is necessary to heat the product for more than 2 hours in order to obtain storage stability; this prolonged heat treatment tends to have an unfavorable effect on the flavor characteristics of the finished product. Conversely, above about 248° F., conditions are comparatively severe and also tend to injure the flavor of the finished composition. Thus, while stable and wholesome food bases may be obtained in accordance with the present invention by treatment over a wide range of temperatures above the boiling point of water, the full advantages of my invention with regard to imparting not only "whole wheat" nutrients but also "whole wheat flavor" to white flour is realized in the 235–248° F. range.

The following examples illustrate the preparation of typical stabilized wheat bases in accordance with the present invention:

*Example I*

10 parts by weight of wheat germ, 45 parts by weight of wheat bran, 45 parts by weight of wheat shorts, and 50 parts by weight of water are uniformly mixed, and heated in a pressure steamer for 1½ hours at 248° F. with saturated steam (gage pressure 14 lbs./sq. in.). The mixture is then dried in hot air at a temperature of 200° F. until its moisture content is reduced to 8%. The dehydrated material is passed through a U. S. standard 16-mesh screen.

The wheat base thus prepared may be stored for long periods and shipped, e. g. in paper bags. About 1 part by weight of the wheat base, mixed with about 3 parts by weight of ordinary white flour yields a flour composition equivalent, from the nutrition standpoint, to whole wheat flour; when baked in accordance with conventional formulae for whole wheat bread, whole wheat muffins or whole wheat rolls, the baked products are virtually indistinguishable in appearance, volume and flavor from baked products made with ordinary whole wheat flour.

*Example II*

Wheat germ, wheat bran, wheat shorts and water are mixed in the same proportions as in Example I, and are heat processed in moist steam at 235° F. (8 lbs./sq. in. gage pressure) for 2 hours and hot air dried at 200° F. or less to 8% residual moisture. The results are the same as in Example I.

*Example III*

10 parts by weight of wheat germ, 90 parts by weight of wheat bran, and 50 parts by weight of water are mixed, and processed as in the preceding example. A stable wheat base results.

*Example IV*

10 parts by weight of wheat germ and 90 parts by weight of wheat shorts and 50 parts by weight of water are mixed, and processed as in Example II. A stable wheat base results.

*Example V*

50 parts by weight of wheat bran, 50 parts by weight of wheat shorts and 40 parts by weight of water are uniformly mixed, and are heated with moist steam in a pressure steamer as in Example II. The resulting product was dehydrated in hot air at 180° F. for 1 hour. After cooling, 90 parts by weight of the dehydrated product were added to 10 parts by weight of wheat germ which had been previously treated with moist steamed super-atmospheric pressure and dried. A dough made from 1 part by weight of this concentrate, added to about 4 parts by weight of white bread flour, yielded a loaf of whole wheat bread of good appearance and eating quality.

As used in the specification and claims, the term "wheat bran" refers to the coarse outer coating of the wheat kernel, and the term "bran-containing wheat cereal" is intended to include wheat bran as well as bran-containing wheat shorts or short-milled wheat flour. Whenever numerical proportions of wheat bran are specified, it will be understood that bran-containing short-milled wheat flour may be substituted in an amount which will yield the specified quantity of bran.

It will be seen from the foregoing detailed description of several embodiments of my invention and processes for carrying the same into practice that I have invented a wheat base whose storage stability greatly exceeds the storage life of ordinary whole wheat flour and which enables the military and civilian operator to store separately white flour and wheat base for prolonged periods and then compound them into a flour composition which is the equivalent of whole wheat flour. While I have indicated preferred proportions and conditions of treatment, it will be understood that departures within the spirit of my invention and readily apparent to the expert are intended to be encompassed within the scope of my invention, which I now define by the appended claims.

I claim:

1. A stabilized wheat base comprising a mixture of water, a minor portion of wheat germ and a major portion of bran-containing wheat cereal, pressure-steamed and dehydrated.

2. A stabilized wheat base comprising a mixture of water, about 10 parts by weight of wheat germ, and about 90 parts by weight of bran-containing wheat cereal, pressure-steamed and dehydrated to a moisture content not exceeding about 8%.

3. A stabilized wheat base comprising a mixture of water, about 10 parts by weight of wheat germ, about 45 parts by weight of wheat bran and about 45 parts by weight of wheat shorts, pressure-steamed and dehydrated to a moisture content not exceeding about 8%.

4. A flour composition resembling whole wheat flour, comprising a major portion of white wheat flour and a minor portion of a stabilized wheat base according to claim 1.

5. A flour composition resembling whole wheat flour, comprising about 75% white wheat flour and about 25% of a stabilized wheat base according to claim 3.

6. A method of preparing a stabilized wheat base, comprising pressure-steaming a mixture of water, a minor portion of wheat germ and a major portion of bran-containing wheat cereal, and dehydrating the pressure-steamed mixture.

7. A method of preparing a stabilized wheat base, comprising pressure-steaming a mixture of water, a minor portion of wheat germ and a major portion of bran-containing wheat cereal at a temperature of at least about 235° F., and dehydrating the pressure-steamed mixture.

8. A method of preparing a stabilized wheat base, comprising pressure-steaming a mixture of water, a minor portion of wheat germ and a major portion of bran-containing wheat cereal at a temperature of about 235–248° F., and dehydrating the pressure-steamed mixture.

9. A method of preparing a stabilized wheat base, comprising pressure-steaming a mixture of water, a minor portion of wheat germ and a major portion of bran-containing wheat cereal at a temperature about 235–248° F., and dehydrating the pressure-steamed mixture to a moisture content not exceeding about 8%.

10. A method according to claim 6, wherein the gage pressure during the steaming step is at least 1 lb. per sq. inch.

11. A method according to claim 6, wherein the gage pressure during the steaming step is about 8–14 lbs. per sq. inch.

12. A method according to claim 6, wherein the duration of the pressure-steaming step is at least 1 hour.

13. A method according to claim 6, wherein the pressure-steaming step is about 1½–2 hours.

14. A method of preparing a stabilized wheat base, comprising pressure-steaming a mixture of water, wheat bran and wheat shorts for at least 1 hour, dehydrating the pressure-steamed mixture, and blending the dehydrated mixture with a minor portion of pressure-steamed wheat germ.

References Cited in the file of this patent

UNITED STATES PATENTS

| Number | Name | Date |
|---|---|---|
| 215,573 | Chichester | May 20, 1879 |
| 897,854 | Schluter, Jr. | Sept. 1, 1908 |
| 1,002,990 | Herendeen | Sept. 12, 1911 |
| 1,586,869 | Wesener | June 1, 1926 |